(12) United States Patent
Cairns

(10) Patent No.: US 7,929,629 B2
(45) Date of Patent: Apr. 19, 2011

(54) METHOD AND APPARATUS FOR IMPROVED CHANNEL ESTIMATION FOR COMMUNICATIONS SIGNAL PROCESSING

(75) Inventor: Douglas A. Cairns, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 617 days.

(21) Appl. No.: 12/027,492

(22) Filed: Feb. 7, 2008

(65) Prior Publication Data

US 2009/0202005 A1 Aug. 13, 2009

(51) Int. Cl.
*H04K 1/10* (2006.01)
*H04B 1/713* (2006.01)

(52) U.S. Cl. .................................. 375/260; 375/147

(58) Field of Classification Search .............. 375/136, 375/144, 147, 148, 260, 262, 267; 370/208, 370/335, 342
See application file for complete search history.

(56) References Cited

U.S. PATENT DOCUMENTS

| | | | |
|---|---|---|---|
| 6,064,689 A | 5/2000 | Vollmer et al. | |
| 6,363,104 B1 | 3/2002 | Bottomley | |
| 2004/0114695 A1 | 6/2004 | Astely et al. | |
| 2004/0247018 A1 | 12/2004 | Pan et al. | |
| 2005/0215218 A1* | 9/2005 | Bottomley et al. | 455/226.1 |
| 2006/0063505 A1* | 3/2006 | Cairns | 455/302 |
| 2006/0209931 A1 | 9/2006 | Moshavi et al. | |
| 2006/0233223 A1 | 10/2006 | Pan et al. | |
| 2006/0251156 A1 | 11/2006 | Grant et al. | |
| 2007/0047628 A1 | 3/2007 | Fulghum et al. | |
| 2007/0072551 A1 | 3/2007 | Pajukoski et al. | |
| 2007/0098048 A1 | 5/2007 | Cairns et al. | |
| 2007/0189364 A1 | 8/2007 | Wang et al. | |
| 2010/0248666 A1* | 9/2010 | Hui et al. | 455/208 |

FOREIGN PATENT DOCUMENTS

| | | |
|---|---|---|
| EP | 1 022 862 | 7/2000 |
| EP | 1 300 999 | 4/2003 |
| EP | 1821445 A1 | 8/2007 |
| WO | 01/61950 A1 | 8/2001 |
| WO | 02/43271 | 5/2002 |
| WO | 2006/034813 | 4/2006 |

(Continued)

OTHER PUBLICATIONS

Astély et al., "Spatiotemporal Interference Rejection Combining," "Smart Antennas: State of the Art," Kaiser et al., eds., 2005, pp. 21-22, Hindawi Publishing Corporation, New York, NY, US.

(Continued)

*Primary Examiner* — Young T. Tse
(74) *Attorney, Agent, or Firm* — Coats & Bennett, P.L.L.C.

(57) ABSTRACT

Teachings presented herein present a "whitening" channel estimation method and apparatus that produce high-quality net channel estimates for processing a received signal, such as a received CDMA signal. Processing includes forming an initial least squares problem (for medium channel estimates) using known pilot values and corresponding pilot observations for the received signal, transforming the initial least squares problem using a whitening transformation term, and solving the transformed least squares problem to obtain whitened medium channel estimates. The whitening transformation term may be determined, for example, by carrying out a Cholesky factorization of a (traffic) data correlation matrix, which can be obtained from traffic data values for the received signal. Processing further includes converting the whitened medium channel estimates into whitened net channel estimates, which consider the effects of transmit/receive filtering.

25 Claims, 3 Drawing Sheets

FOREIGN PATENT DOCUMENTS

| WO | 2006/067258 A1 | 6/2006 |
|---|---|---|
| WO | 2007/000620 A1 | 1/2007 |

OTHER PUBLICATIONS

Hai et al., "Approaches for Fast, Adaptive, Generalized Rake Reception," Research Disclosure, Nov. 1, 2003, pp. 1-2, vol. 475, No. 41, Mason Publications, Hampshire, Great Britain.

Lenardi et al., "A Rake Receiver with Intracell Interference Cancellation for a DS-CDMA Synchronous Downlink with Orthogonal Codes," Vehicular Technology Conference, Tokyo, Japan, May 15-18, 2000, pp. 430-434, IEEE, New York, NY, US.

Redekar et al., "Equivalence of the Linear Symbol-level MMSE and the Generalized RAKE," IEEE Region 10 Tencon, Nov. 1, 2005, pp. 1-3.

Tiirola et al., "Performance of Smart Antenna Receivers in WCDMA Uplink with Spatially Coloured Interference," IST Mobile Communications Summit, Barcelona, Spain, Sep. 9-12, 2001, pp. 1-15.

Venkatesan et al., "An Iterative Algorithm for Computing a Spatial Whitening Filter," 2004 IEEE 5th Workshop on Signal Processing Advances in Wireless Communications, Lisbon, Portugal, Jul. 11-14, 2004, pp. 338-342, IEEE, Piscataway, NJ, US.

Fulghum, Tracy et al. "Low Complexity Parameter Estimation for the Multi-antenna Generalized Rake Receiver." IEEE 63rd Vehicular Technology Conference, 2006 (VTC 2006-Spring), May 7-10, 2006, vol. 4, pp. 1874-1878.

Simeone, O. et al. "Subspace Tracking for Uplink/Downlink Array Processing CDMA Systems." IEEE Global Telecommunications Conference (GLOBECOM), 2003, vol. 2, pp. 824-828.

Co-pending U.S. Appl. No. 11/935,604 filed on Nov. 6, 2007.

\* cited by examiner

METHOD AND APPARATUS FOR IMPROVED CHANNEL ESTIMATION FOR COMMUNICATIONS SIGNAL PROCESSING

TECHNICAL FIELD

The present invention generally relates to communications signal processing, and particularly relates to channel estimation in support of such processing.

BACKGROUND

Existing and future wireless communication standards focus on improving spectral efficiency and data throughput. In terms of data throughput in particular, the developing wireless communication standards offer significantly improved performance as compared to earlier standards, such as GSM, GPRS, IS-95, and CDMA2000. For example, Release 7 of the Wideband Code Division Multiple Access (WCDMA) standards defines radio link peak data rates approaching or exceeding 28.8 Mbits/s. Future radio standards are expected to continue increasing peak data rates.

Achieving anything close to the defined peak data rates in actual practice requires the use of high-quality signal transmitters and receivers. For example, virtually all contemporary (and planned) wireless communication devices include channel estimation processing, wherein "channel estimates" are generated to account for the distortion caused by propagating an electromagnetic signal from the transmitter to the receiver. The quality of channel estimation at the receiver directly affects its ability to recover transmitted information from the received signal with acceptably low error rates.

Known efforts to improve channel estimation include the adoption of minimum mean square error estimation techniques. For example, the co-pending and commonly assigned U.S. patent application, as filed on 6 Nov. 2007 and assigned application Ser. No. 11/935,604, discloses a minimum mean square error (MMSE) channel estimation process that obtains the MMSE solution for medium channel coefficients as a function a medium coefficient correlation matrix, an impairment correlation matrix, and (measured) net channel responses.

SUMMARY

Teachings presented herein present a "whitening" channel estimation method and apparatus that produce high-quality net channel estimates for processing a received signal, such as a received CDMA signal. Processing includes forming an initial least squares problem (for medium channel estimates) using known pilot values and corresponding pilot observations for the received signal, transforming the initial least squares problem using a whitening transformation term, and solving the transformed least squares problem to obtain whitened medium channel estimates. The whitening transformation term may be determined, for example, by carrying out a Cholesky factorization of a (traffic) data correlation matrix, which can be obtained from traffic data values for the received signal. Processing further includes converting the whitened medium channel estimates into whitened net channel estimates, which consider the effects of transmit/receive filtering.

However, the present invention is not limited to the above features and advantages. Indeed, those skilled in the art will recognize additional features and advantages upon reading the following detailed description, and upon viewing the accompanying drawings.

DETAILED DESCRIPTION

Figure 1:
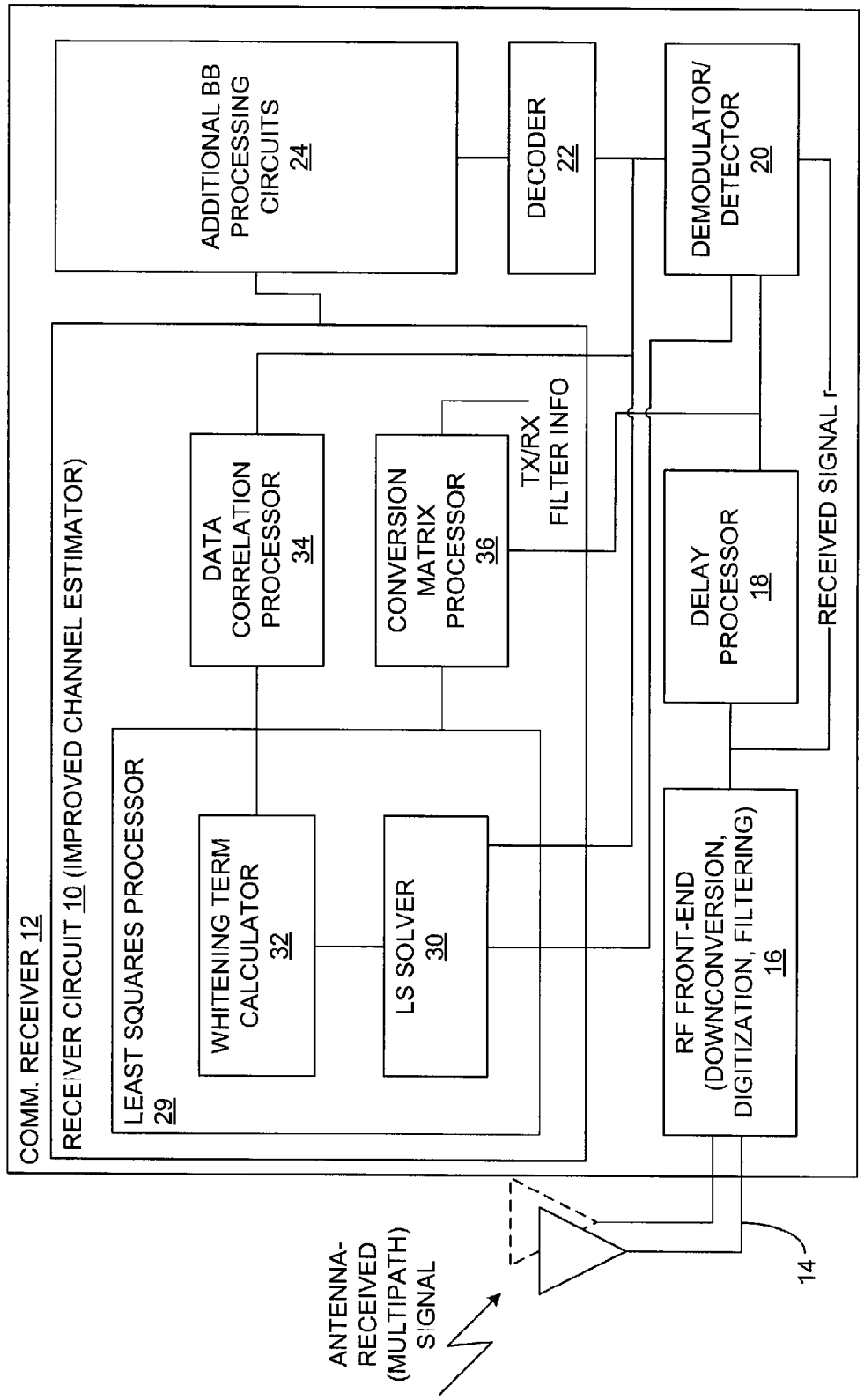
FIG. 1 is a block diagram of a channel estimator according to one or more embodiments taught herein, shown in the context of an example communications receiver.

FIG. 1 illustrates one embodiment of a receiver circuit 10 comprising a portion of a communications receiver 12. The receiver circuit 10 operates as an improved channel estimation circuit, and therefore is also referred to as the "channel estimator 10." The word "improved" in this context denotes without limitation that the channel estimator 10 considers the effects of received signal interference in its channel estimation.

Broadly, the channel estimator 10 produces "whitened" channel estimates in which the effects of colored interference are substantially reduced. Such channel estimates are "improved" in quality with respect to non-whitened channel estimates and these high-quality channel estimates improve the performance of the communications receiver 12 in various areas of signal processing, such as received signal demodulation/decoding, received signal quality estimation, etc. As a further, non-limiting point of improvement, the channel estimator 10 employs computationally efficient and robust whitening techniques that have broad applicability in a range of communication receiver types.

To provide discussion context for the channel estimator 10 and the corresponding channel estimation method implemented by it, FIG. 1 illustrates further functional receiver circuit elements. However, those skilled in the art will appreciate that the illustrated receiver circuit architecture is not limiting with respect to the channel estimator 10, and that the channel estimator 10 (and/or its processing method) can be implemented in other receivers.

As for the illustrated example, one sees that the receiver 12 includes one or more receive antennas 14 for receiving a communication signal from a remote transmitter (not shown). Generally, this antenna-received signal, e.g., a Wideband Code Division Multiple Access (WCDMA) signal, is a multipath signal and includes desired and interfering signal components received on a plurality of propagation channels. As will be further understood, the antenna-received signal may comprise a plurality of code-channelized signals, including pilot channel signals carrying pilot information and traffic channel signals carrying traffic data.

The receiver 12 further includes a radiofrequency (RF) front-end circuit 16, that down-converts, digitizes, and filters the antenna-received signal as needed or desired. A delay processor 18 processes the digitized signal, referred to as the "received signal r" for purposes of this description, to identify the processing delays to be used for multipath processing of the received signal. For example, the delay processor 18 may include a path searcher function that correlates the received signal to a particular pilot or other correlation sequence, to identify correlation peaks at signal delays corresponding to the strongest multipath components. As is known for Generalized Rake (G-Rake) and chip equalization (CE) receivers, the delay processor 18 uses the identified path delays to determine the particular processing delays to be used for multipath processing of the received signal, e.g., it calculates the G-Rake finger or CE filter tap delays to be used for collecting desired signal and interfering signal energy from the received signal.

The receiver 12 further includes a demodulator/detector 20, which may be implemented as a G-Rake based or CE based circuit, and which is operative to detect transmitted pilot and traffic data symbols from the received signal. As is known in the art, G-Rake receivers include a number of "Rake fingers" (correlators) that are placed at selected processing delays for recovering pilot and traffic data from the received signal. Some of these fingers are used to collect desired signal energy and some are used to collect interfering signal energy. Finger output signals are combined using combining weights that consider channel effects and interference effects. Similar processing is known for use in chip equalization embodiments, wherein an equalization filter precedes a single correlator. The equalization filter includes a series of delay stages, with each stage providing an output ("tap"). Channel equalization and interference suppression are achieved in this context by combining selected ones of the filter taps using appropriately calculated combining weights, as in the G-Rake case.

The receiver 12 further includes a decoder 22, which is operative to decode transmitted data from the demodulated symbols output by the demodulator/detector 20. For example, traffic data and control signaling information encoded on various code channels within the received signal are recovered for processing by one or more additional baseband (BB) processing circuits 24.

Within this example context, the channel estimator 10 provides "improved" channel estimates. These improved channel estimates are used, for example, in the demodulation process implemented in the demodulator/detector 20. More particularly, the improved channel estimates produced by the channel estimator 10 may be used in computing Rake/CE combining weights, received signal SIR estimation, etc. In one or more embodiments, the channel estimator 10 comprises digital processing circuits, including a least squares (LS) processor 29 that includes an LS solver 30 and a whitening term calculator 32, a data correlation processor 34, and a conversion matrix processor 36. These functional circuits may be implemented in hardware, software, or any combination thereof.

In one embodiment, a general-purpose or special-purpose microprocessor (e.g., a DSP) executes stored program instructions from a computer program held in a computer-readable medium, e.g., a memory device included in or accessible by the receiver 12. In another embodiment, at least a portion of the channel estimator's functionality is implemented in dedicated signal processing hardware. In either case, it should be understood that the channel estimator 10 preferably comprises functional digital processing elements that can be integrated with other baseband signal processing hardware and/or software.

In a more detailed discussion of the channel estimator 10, it may be helpful to begin with an overview of terminology. Two types of channel coefficients will be referred to throughout the disclosure. The first type, "medium coefficients," refers to the complex values associated with the (multipath) radio channel. The second type, "net coefficients," includes the effects of transmit filtering at the remote transmitter (not shown) and receiver filtering at the receiver 12, in addition to the medium coefficients. The medium coefficients are denoted by g, where g is a KL×1 vector of complex values associated with L radio channel paths across K antennas. It is assumed that the coefficients corresponding to each antenna are stacked according to $g = [g_1^H, g_2^H, \ldots, g_K^H]^H$, where $g_k$ denotes the vector of medium coefficients corresponding to the $k^{th}$ antenna. The net coefficients are denoted by h, where h is a KM×1 vector of complex values (M≧L) associated with the M receiver fingers across K antennas. Similar to g, h is a composite vector formed by stacking the individual antenna contributions ($h = [h_1^H, h_2^H, \ldots, h_k^H]^H$). One can convert from medium to net coefficients via $$h = Bg,  \quad\quad\quad \text{Eq. (1)}$$

where B is an KM×KL block-diagonal conversion matrix $$B = \begin{bmatrix} B_1 & 0 & 0 & 0 \\ 0 & B_2 & 0 & 0 \\ 0 & 0 & \ddots & 0 \\ 0 & 0 & 0 & B_K \end{bmatrix}.$$

The (i, j) element of $B_k$ is given by $$b_k(i,j) = R_{TX/RX}(d_i - \tau_j). \quad\quad\quad \text{Eq. (2)}$$

Here, $R_{TX/RX}(\lambda)$ is the convolution of the transmit and receive filters evaluated at $\lambda$, $d_i$ is the delay of the $i^{th}$ receiver finger, and $\tau_j$ is the $j^{th}$ path delay. The conversion from net to medium coefficients is given by $$g = (B^H B)^{-1} B^H h. \quad\quad\quad \text{Eq. (3)}$$

In one or more embodiments, the channel estimator 10 is configured to form a least squares estimation problem using, e.g., data from a pilot channel in the received signal. The least squares problem is then transformed using a whitening step, and the whitened least squares problem is then solved to give high-quality channel estimates. In this context, "forming" a least squares problem connotes the channel estimator 10 setting up a least squares numerical computation based on a model matrix having channel model element values, a coefficients matrix having (unknown) coefficients to be solved for, and an observation matrix having observed pilot/channel element values.

To understand the channel estimation method taught herein, first consider the standard model for pilot despread symbols, which is expressed as $$x_{pilot}(i) = B g_{pilot} s_{pilot}(i) + u(i). \quad\quad\quad \text{Eq. (4)}$$

Here, $g_{pilot}$ is a vector of medium channel coefficients scaled by the square root of the pilot symbol energy ($g_{pilot} = \sqrt{E_p} g$), $s_{pilot}(i)$ is the $i^{th}$ known pilot symbol, and u(i) is a vector of impairment (interference plus noise) samples for the $i^{th}$ symbol in a current transmission time period. For a WCDMA signal, that period may be, for example, a defined transmission time slot within any given transmission time interval (TTI). To form a least squares problem here, the channel estimator 10 is configured to "create" the following model and observation matrices, respectively, from the Q pilot symbol intervals in the current slot $$(\text{channel) model matrix } A = \begin{bmatrix} B s_{pilot}(0) \\ B s_{pilot}(1) \\ \vdots \\ B s_{pilot}(Q-1) \end{bmatrix}, \quad \text{Eq. (5)}$$

and $$\text{(pilot) observation matrix } b = \begin{bmatrix} x_{pilot}(0) \\ x_{pilot}(1) \\ \vdots \\ x_{pilot}(Q-1) \end{bmatrix}. \qquad \text{Eq. (6)}$$

Note that the pilot observation matrix b is a vector of observed pilot values for the received signal over a given slot or other defined processing time period. Also, note that if $s_{pilot}(0)=s_{pilot}(1)=\ldots=s_{pilot}(Q-1)$, then the channel estimator 10 could alternatively be formed from $A=Bs_{pilot}(0)$ and $$b = \frac{1}{Q}\sum_{q=0}^{Q-1} x_{pilot}(q)\bigg).$$

With the above formulation, the initial LS problem formed by the channel estimator 10 can be derived from or represented according to the following expression, $$Ag=b, \qquad \text{Eq. (7)}$$

where A is the channel model matrix, b is the observation matrix, and g is a vector of medium channel coefficients matrix to be solved for via least squares processing. The solution for g minimizes the Euclidean norm squared of the residual Ag−b.

However, rather than solving Eq. (7) for the medium channel coefficients g, the channel estimation method taught herein applies a whitening transformation to A and b. The theoretically correct whitening transformation is the inverse of the Cholesky factor of the impairment covariance matrix $R_u$, which can be estimated, for example, by taking cross correlations between pilot values across different processing delays/antennas. However, there may be advantages in approximating the impairment covariance matrix by a data correlation matrix. An estimate of the data correlation matrix can be obtained using one or more channelization codes of the desired signal traffic channel in the received signal via $$\hat{R}_d = \frac{1}{P}\sum_{p=0}^{P-1}\frac{1}{K}\sum_{k=0}^{K-1} x_{traffic}^p(k)(x_{traffic}^p(k))^H, \qquad \text{Eq. (8)}$$

where $x_{traffic}^p(k)$ is a vector of despread traffic symbols corresponding to the $p^{th}$ code for the $k^{th}$ symbol time. The estimate of the data correlation matrix is Cholesky factorized $$GG^H=\text{chol}(\hat{R}_d), \qquad \text{Eq. (9)}$$

and the inverse of either the lower triangular or upper triangular factor is computed. The inverse Cholesky factor is applied to A and b to give $$\tilde{A}=G^{-1}A$$

$$\tilde{b}=G^{-1}b \qquad \text{Eq. (10)}$$

These transformed matrices can be used to compute high quality (whitened) medium channel estimates via $$g_{whitened} = (\tilde{A}^H\tilde{A})^{-1}\tilde{A}^H\tilde{b}. \qquad \text{Eq. (11)}$$

The corresponding high quality net channel estimates can then be computed from the whitened medium channel estimates as $$h_{whitened}=Bg_{whitened}. \qquad \text{Eq. (12)}$$

These high quality net channel coefficients can then be used by the receiver 12 in various aspects of received signal processing, such as in demodulation, SIR estimation, etc.

Figures 2, 3:
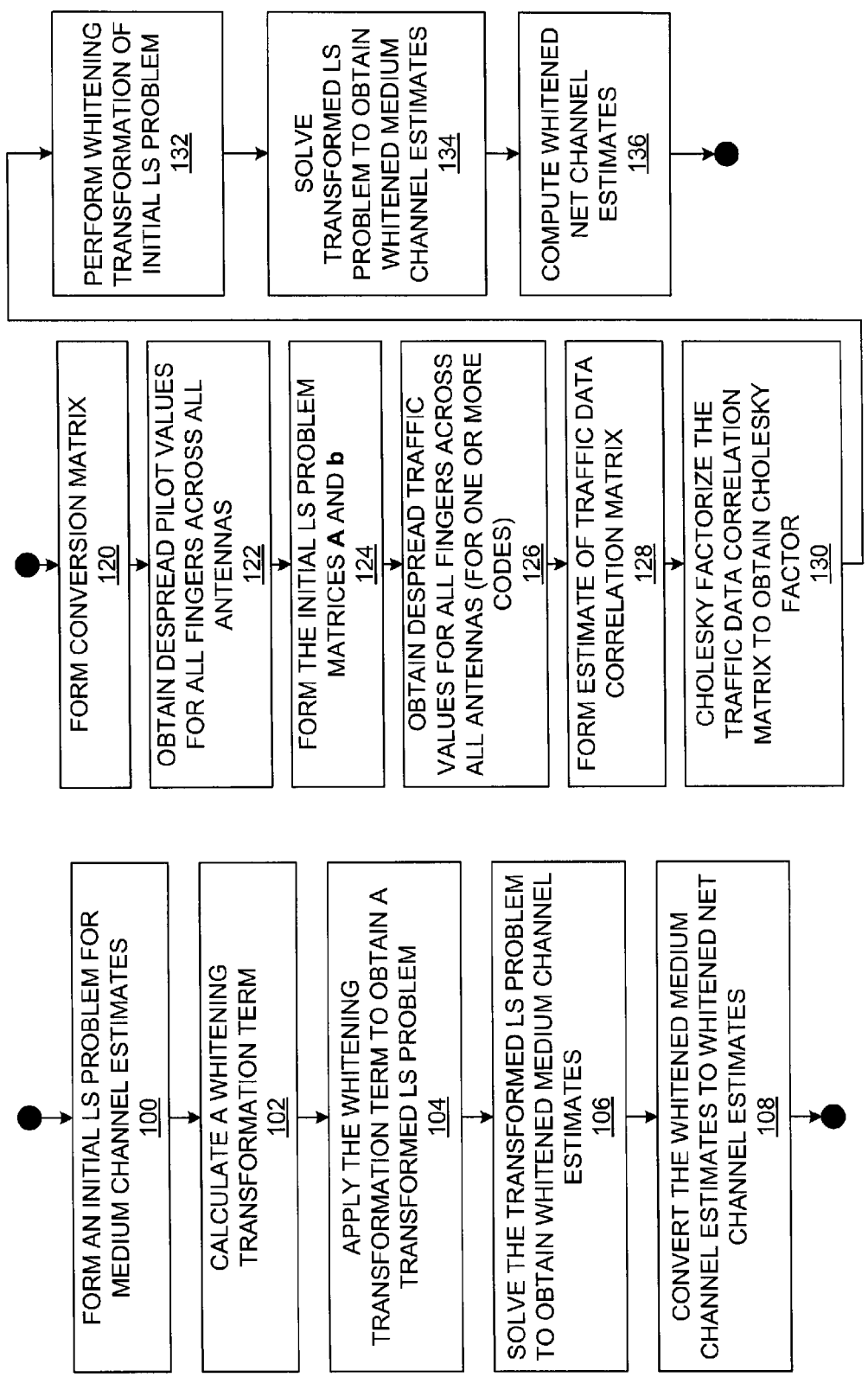
FIG. 2 is a logic flow diagram illustrating one embodiment of a method of channel estimation taught herein.
FIG. 3 is a logic flow diagram illustrating example details for the channel estimation method outlined in FIG. 2.

FIG. 2 illustrates one embodiment of channel estimation according to the above processing operations. Such processing can be implemented in the receiver circuit 10 via hardware, software, or any combination thereof. In general, as noted, the receiver circuit 10 includes one or more processing circuits, e.g., the LS solver 30, the whitening term calculator 32, etc. Whether the illustrated functional circuits are implemented or alternative arrangements are adopted, the one or more processing circuits of the channel estimator 10 are configured according to FIG. 2 to produce high quality, whitened net channel estimates according to the following processing steps.

The channel estimator 10 forms an initial least squares problem for medium channel estimates based on known pilot values and corresponding pilot observations for the received signal (Step 100). Processing continues with calculating a whitening transformation term based on a Cholesky factorization of a traffic data correlation matrix determined for the received signal (Step 102), and with applying the whitening transformation term to the initial least squares problem to obtain a transformed least squares problem (Step 104). Processing continues with solving the transformed least squares problem to obtain whitened medium channel estimates for the received signal (Step 106), and converting the whitened medium channel estimates to whitened net channel estimates for processing the received signal by applying a medium-to-net conversion matrix to the whitened medium channel estimates (Step 108).

Forming the initial least squares problem for medium channel estimates based on known pilot values and corresponding pilot observations for the received signal may include obtaining the pilot observations as pilot values obtained from the received signal for all received signal processing delays of interest on each of one or more receive antennas. More particularly, in a G-Rake embodiment, the pilot observations correspond to despread pilot symbols taken at all processing delays of interest on each of one or more receive antennas in use.

Similarly, the traffic data correlation matrix may be estimated from despread traffic data values obtained for one or more traffic channelization codes used in the received signal. With that, calculating the whitening transformation term based on a Cholesky factorization of a traffic data correlation matrix determined for the received signal may include estimating the traffic data correlation matrix from (despread) traffic data values obtained from the received signal and determining a Cholesky factor of the traffic data correlation matrix.

In any case, it should be understood that in one or more embodiments the received signal comprises a CDMA signal comprising pilot data and traffic data on different channelization codes. Therefore, forming an initial least squares problem for medium channel estimates based on known pilot values and corresponding pilot observations for the received signal may comprise forming a model matrix representing a channel model based on the conversion matrix and known pilot values for the CDMA signal and forming an observation matrix based on despread pilot values obtained from the received signal.

Also, as noted, the initial least squares problem of Step 100 in FIG. 2 includes a model matrix A representing a channel model, an observation matrix b representing the pilot observations, and a coefficients matrix g for fitting the model matrix to the observations. Thus, applying the whitening transformation term to the initial least squares problem to obtain a transformed least squares problem comprises, in one or more embodiments, applying the Cholesky factor to the model and observation matrices. In at least one such embodiment, that step comprises applying the inverse Cholesky factor to the model matrix to obtain a transformed model matrix $\tilde{A}$, and applying the Cholesky factor to the observation matrix to obtain a transformed observation matrix $\tilde{b}$ for use in the transformed least squares problem. In another such embodiment, applying the Cholesky factor to the model and observation matrices comprises expressing the transformed model matrix as a function of the Cholesky factor and the model matrix and solving for the transformed model matrix, and expressing the transformed observation matrix as a function of the Cholesky factor and the observation matrix and solving for the transformed observation matrix.

Still further, as was noted regarding Eq. (2), calculating the medium-to-net conversion matrix is, in one or more embodiments, based on known transmit/receive filter characteristics and on differences between received signal processing delays and received signal multipath delays. The transmit and receive filters—e.g., transmit and receive pulse-shaping filters—may be the same or different. However, in either case, the filter characteristics are known to the channel estimator 10. For example, the channel estimator 10 may hold filter parameters or other values in memory representing the transmit/receive filter characteristics and make these values accessible to the conversion matrix processor 36. Further, the conversion matrix processor 36 is provided with multipath and processing delay values representing the multipath delays of interest and the corresponding processing delays (e.g., Rake finger or CE tap delays) being used to process the multipath received signal. In terms of converting the whitened medium channel estimates, one or more embodiments obtain the whitened net channel estimates by calculating them as a product of the conversion matrix and the whitened medium channel estimates.

FIG. 3 illustrates a more detailed processing flow, representing a preferred embodiment of the processing introduced in FIG. 2, set in the context of a Rake receiver embodiment of the receiver 12. Processing includes forming the medium-to-net conversion matrix B (Step 120), e.g., according to Eq. (2), obtaining despread pilot values for all (Rake) fingers across all (active) receiver antennas 14 (Step 122), and forming the initial LS problem matrices (Step 124), e.g., according to Eq. (5) and Eq. (6). Processing continues with obtaining despread traffic values for all fingers across all antennas for one or more codes (Step 126), forming an estimate of the traffic data correlation matrix $\hat{R}_d$ (Step 128), e.g., according to Eq. (8). Processing continues with Cholesky factorization of the estimated traffic data correlation matrix $\hat{R}_d$ to obtain G (Step 130), and use of the Cholesky factor to obtain the transformed LS matrices $\tilde{A}$ and $\tilde{b}$ (Step 132). The transformation may be accomplished by inverting G, such as is done in Eq. (10). Alternatively, the channel estimator 10 may be configured to solve $G\tilde{A}=A$ and $G\tilde{b}=b$ to obtain $\tilde{A}$ and $\tilde{b}$. There may be an advantage to this latter configuration because G is lower triangular.

Processing continues with solving the transformed LS problem (Step 134), e.g., according to Eq. (11), which produces the whitened medium channel estimates $g_{whitened}$. Still further, processing continues with computing the whitened net channel estimates (Step 136) $h_{whitened}$ from $g_{whitened}$, e.g., according to Eq. (12).

Of course, except where indicated (or necessary), the teachings herein are not limited to the particular order or sequence of processing steps illustrated in FIG. 2 or 3. Indeed, it should be understood that other processing step orders are contemplated herein, and that one or more processing steps may be carried out in parallel. Indeed, the processing steps of FIGS. 2 and 3 may be carried out as part of or along with other received signal processing operations. For example, the high-quality channel estimation taught herein may be carried out (and repeated) on a per-slot/per-TTI basis, and may represent a part of overall received signal processing for received signal demodulation/decoding, etc.

Figure 4:
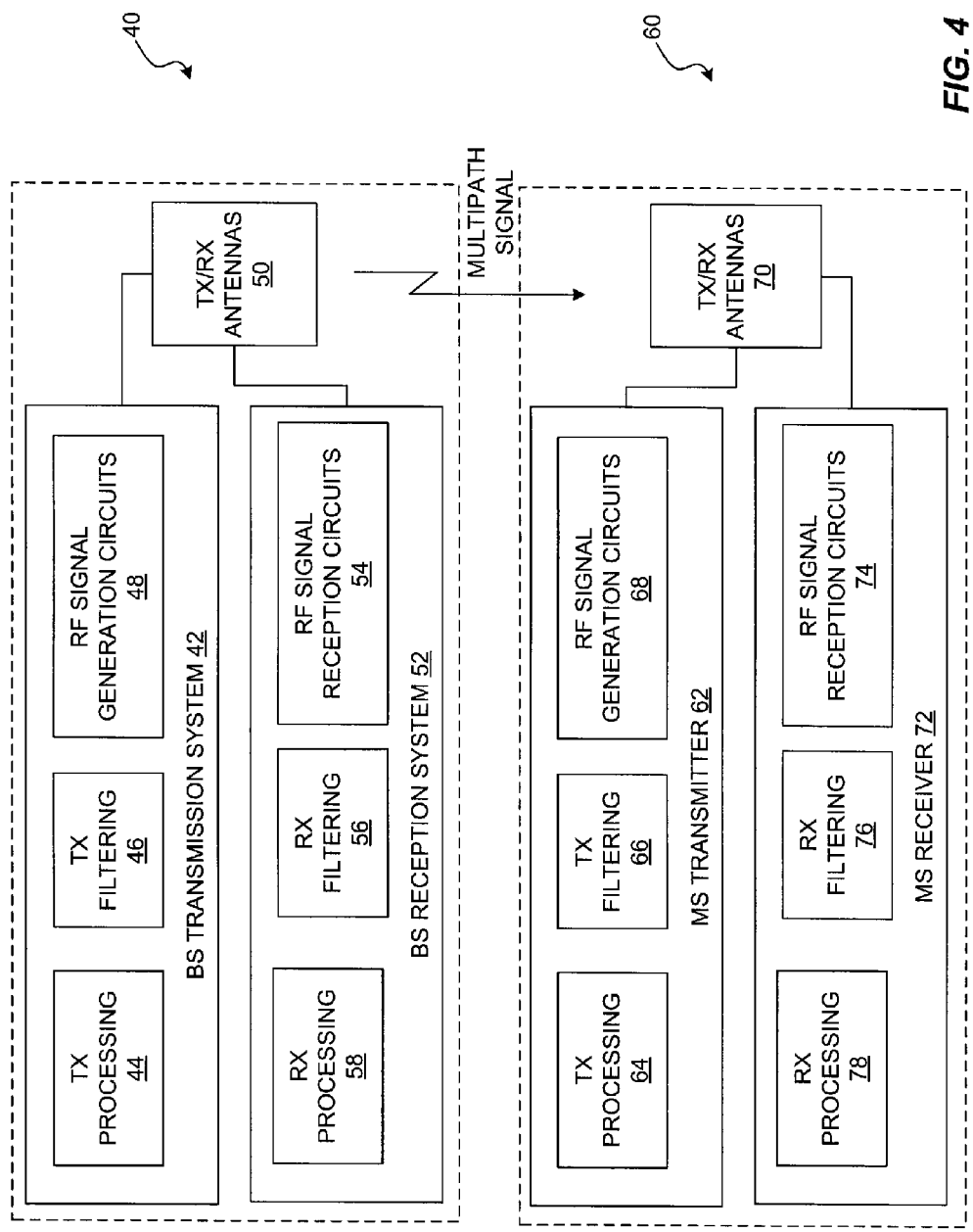
FIG. 4 is a block diagram of a wireless communication network base station and a corresponding mobile station, either or both of which incorporate a channel estimator as taught herein.

For a further example context, FIG. 4 illustrates a wireless communication base station 40, such as a WCDMA base station configured for use within a WCDMA-based cellular communication network. The example base station 40 includes a base station transmission system 42, which is configured to transmit one or more CDMA signals. Such signals carry, for example, overhead and control signaling, common/dedicated pilot information, and traffic data signals for potentially many remote mobile stations. The base station transmission system includes transmit processing circuits 44, transmit filtering circuits 46, RF signal generation circuits 48, and transmit/receive antennas 50.

The base station 40 further includes a base station reception system 52, which is configured to receive uplink signals on the transmit/receive antennas 50 from a plurality of remote mobile stations. The illustrated reception system 52 includes RF signal reception circuits 54, for front-end signal processing, RX filtering circuits 56, and RX processing circuits 58. Those skilled in the art will appreciate that the base station 40 also includes other circuits/systems not illustrated. For example, the base station 40 may include various core network interfaces, sidehaul interfaces to other base stations, various call control/processing circuits, etc.

For purposes of this discussion, it will be understood that the illustrated base station architecture is exemplary and that the previously described channel estimator 10 in any of its various embodiments may be implemented within the RF reception circuits 54, or, more conveniently, within the (baseband) RX processing circuits 58. Further, the channel estimator 10 may be duplicated in hardware and/or software for use in estimating channels for each in the plurality of mobile stations being supported on the base station's uplink. Such processing may yield particular improvements in base station processing performance where uplink interference cancellation is practiced. That is, the whitened net channel estimates produced by the channel estimator 10 are particularly useful in, for example, successive interference cancellation (SIC) receivers. In SIC receivers, interfering signal components are regenerated and subtracted and that signal regeneration is based on the corresponding channel estimates. Thus, higher quality channel estimates yields higher quality regenerated signals and more accurate signal subtraction.

The channel estimator 10 also may be additionally or alternatively implemented in the mobile station 60 illustrated in FIG. 4. As with the base station 40, the mobile station 60 is, in a non-limiting example, a cellular radiotelephone or other mobile communication device that is configured for operation within a cellular communication network. For example, the mobile station 60 comprises a WCDMA device configured for operation in a WCDMA network that includes the base station 40.

The illustrated embodiment of the mobile station 60 includes a transmitter 62, which includes a transmit processing circuit 64, a transmit filtering circuit 66, RF signal generation circuits 68 for signal transmission, and associated TX/RX antennas 70. The mobile station 60 further includes a receiver 72, which includes RF signal reception circuits 74, RX filtering circuits 76, and RX processing circuits 78. As with the base station 40, the mobile station illustration is simplified, and an actual mobile station 60 may include further processing circuits, user interface circuits, etc., depending upon its intended use.

In any case, those skilled in the art will appreciate that the previously described channel estimator 10 can be implemented, for example, in the (baseband) RX processing circuits 78 of the mobile station 60. Broadly, the channel estimator 10 may be implemented in a variety of wireless communication devices systems, such as wireless communication network base stations for channel estimation supporting uplink signal processing, and in wireless communication network mobile stations for channel estimation supporting downlink signal processing. Such mobile stations encompass without limitation cellular telephones, wireless pagers, PDAs, network access cards or modules, wireless-enabled computers, etc.

Further, those skilled in the art will appreciate the broad applicability of the channel estimator 10 (and its embodied methods) to other signal processing devices and systems, both wireless and wired. As such, it should be understood that the foregoing description and the accompanying drawings represent non-limiting examples of the methods, systems, and individual apparatuses taught herein. The present invention therefore is not limited by the foregoing description and accompanying drawings. Instead, the present invention is limited only by the following claims and their legal equivalents.

What is claimed is:

1. A method of channel estimation for a received signal comprising:
   forming an initial least squares problem for medium channel estimates based on known pilot values and corresponding pilot observations for the received signal;
   calculating a whitening transformation term based on a Cholesky factorization of a traffic data correlation matrix determined for the received signal;
   applying the whitening transformation term to the initial least squares problem to obtain a transformed least squares problem;
   solving the transformed least squares problem to obtain whitened medium channel estimates for the received signal; and
   converting the whitened medium channel estimates to whitened net channel estimates for processing the received signal by applying a medium-to-net conversion matrix to the whitened medium channel estimates.

2. The method of claim 1, wherein forming the initial least squares problem for the medium channel estimates based on the known pilot values and the corresponding pilot observations for the received signal includes obtaining the pilot observations as pilot values obtained from the received signal for all received signal processing delays of interest on each of one or more receive antennas.

3. The method of claim 1, wherein calculating the whitening transformation term based on the Cholesky factorization of the traffic data correlation matrix determined for the received signal includes estimating the traffic data correlation matrix from traffic data values obtained from the received signal and determining a Cholesky factor of the traffic data correlation matrix.

4. The method of claim 3, wherein the initial least squares problem includes a model matrix representing a channel model, an observation matrix representing the pilot observations, and a coefficients matrix for fitting the model matrix to the observation, and wherein applying the whitening transformation term to the initial least squares problem to obtain the transformed least squares problem comprises applying the Cholesky factor to the model and observation matrices.

5. The method of claim 4, wherein applying the Cholesky factor to the model and observation matrices comprises applying an inverse Cholesky factor to the model matrix to obtain a transformed model matrix for use in the transformed least squares problem, and applying the inverse Cholesky factor to the observation matrix to obtain a transformed observation matrix for use in the transformed least squares problem.

6. The method of claim 4, wherein applying the Cholesky factor to the model and observation matrices comprises expressing a transformed model matrix as a function of the Cholesky factor and the model matrix and solving for the transformed model matrix for use in the transformed least squares problem, and expressing a transformed observation matrix as a function of the Cholesky factor and the observation matrix and solving for the transformed observation matrix for use in the transformed least squares problem.

7. The method of claim 1, further comprising calculating the medium-to-net conversion matrix based on known transmit/receive filter characteristics and differences between received signal processing delays and received signal multipath delays.

8. The method of claim 7, wherein the received signal processing delays comprise one of Rake finger correlation delays in a Rake receiver circuit and equalization filter tap delays in a chip equalization receiver circuit.

9. The method of claim 1, wherein converting the whitened medium channel estimates to the whitened net channel estimates for processing the received signal by applying the medium-to-net conversion matrix to the whitened medium channel estimates comprises calculating the whitened net channel estimates as a product of the medium-to-net conversion matrix and the whitened medium channel estimates.

10. The method of claim 1, wherein the received signal comprises a Code Division Multiple Access (CDMA) signal comprising pilot data and traffic data on different channelization codes, and wherein forming the initial least squares problem for the medium channel estimates based on the known pilot values and the corresponding pilot observations for the received signal comprises forming a model matrix representing a channel model based on the medium-to-net conversion matrix and the known pilot values for the CDMA signal and forming an observation matrix based on despread pilot values obtained from the received signal.

11. The method of claim 10, wherein calculating the whitening transformation term based on the Cholesky factorization of the traffic data correlation matrix determined for the received signal includes estimating the traffic data correlation matrix from despread traffic data values obtained for one or more traffic channelization codes used in the received signal and calculating the whitening transformation term as a Cholesky factor of the traffic data correlation matrix.

12. A receiver circuit configured to generate channel estimates for a received signal received by an associated communications receiver, said receiver circuit comprising one or more processing circuits configured to:

form an initial least squares problem for medium channel estimates based on known pilot values and corresponding pilot observations for the received signal;

calculate a whitening transformation term based on a Cholesky factorization of a traffic data correlation matrix determined for the received signal;

apply the whitening transformation term to the initial least squares problem to obtain a transformed least squares problem;

solve the transformed least squares problem to obtain whitened medium channel estimates for the received signal; and convert the whitened medium channel estimates to whitened net channel estimates for processing the received signal by applying a medium-to-net conversion matrix to the whitened medium channel estimates.

13. The receiver circuit of claim 12, wherein the receiver circuit is configured to obtain the pilot observations as pilot values obtained from the received signal for all received signal processing delays of interest on each of one or more receive antennas of the associated communications receiver.

14. The receiver circuit of claim 12, wherein the receiver circuit is configured to estimate the traffic data correlation matrix from traffic data values obtained from the received signal and determine a Cholesky factor of the traffic data correlation matrix for use as the whitening transformation term.

15. The receiver circuit of claim 14, wherein the initial least squares problem includes a model matrix representing a channel model, an observation matrix representing the pilot observations, and a coefficients matrix for fitting the model matrix to the observation, and wherein the receiver circuit is configured to apply the Cholesky factor to the model and observation matrices to obtain the transformed least squares problem.

16. The receiver circuit of claim 15, wherein the receiver circuit is configured to apply the Cholesky factor to the model and observation matrices based on applying an inverse Cholesky factor to the model matrix to obtain a transformed model matrix for use in the transformed least squares problem, and applying the inverse Cholesky factor to the observation matrix to obtain a transformed observation matrix for use in the transformed least squares problem.

17. The receiver circuit of claim 15, wherein the receiver circuit is configured to apply the Cholesky factor to the model and observation matrices based on expressing a transformed model matrix as a function of the Cholesky factor and the model matrix and solving for the transformed model matrix, and expressing a transformed observation matrix as a function of the Cholesky factor and the observation matrix.

18. The receiver circuit of claim 12, wherein the receiver circuit is configured to calculate the medium-to-net conversion matrix based on known transmit/receive filter characteristics and time differences between received signal processing delays and received signal multipath delays.

19. The receiver circuit of claim 18, wherein the received signal processing delays comprise one of Rake finger correlation delays in a Rake receiver circuit and equalization filter tap delays in a chip equalization receiver circuit.

20. The receiver circuit of claim 12, wherein the receiver circuit is configured to convert the whitened medium channel estimates to the whitened net channel estimates by calculating the whitened net channel estimates as a product of the medium-to-net conversion matrix and the whitened medium channel estimates.

21. The receiver circuit of claim 12, wherein the received signal comprises a Code Division Multiple Access (CDMA) signal comprising pilot data and traffic data on different channelization codes, and wherein the receiver circuit is configured to form the initial least squares problem by forming a channel model matrix based on the medium-to-net conversion matrix and the known pilot values for the CDMA signal and forming an observation matrix based on despread pilot values obtained from the received signal.

22. The receiver circuit of claim 21, wherein the receiver circuit is configured to calculate the whitening transformation term by estimating the traffic data correlation matrix from despread traffic data values obtained for one or more traffic channelization codes used in the received signal and calculating the whitening transformation term as a Cholesky factor of the traffic data correlation matrix.

23. The receiver circuit of claim 12, wherein the receiver circuit comprises all or part of a Rake receiver circuit within the communications receiver of a wireless communications device.

24. The receiver circuit of claim 12, wherein the receiver circuit comprises all or part of a chip equalization circuit within the communications receiver of a wireless communications device.

25. The receiver circuit of claim 12, wherein the one or more processing circuits comprise one or more digital processing circuits including a conversion matrix processor configured to calculate the medium-to-net conversion matrix, a least squares processor configured to form the initial and transformed least squares problems and to solve the transformed least squares problem for the whitened medium channel estimates, and a correlation processor configured to generate the traffic data correlation matrix.

* * * * *